US011061848B1

(12) United States Patent
Seto et al.

(10) Patent No.: US 11,061,848 B1
(45) Date of Patent: Jul. 13, 2021

(54) INFORMATION PROCESSING APPARATUS AND CONTROL METHOD

(71) Applicant: LENOVO (SINGAPORE) PTE. LTD., Singapore (SG)

(72) Inventors: Yuichiro Seto, Yokohama (JP); Munefumi Nakata, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/856,330

(22) Filed: Apr. 23, 2020

(30) Foreign Application Priority Data

Jan. 24, 2020 (JP) .............................. JP2020-010084

(51) Int. Cl.
*G06F 1/3206* (2019.01)
*G06F 13/40* (2006.01)
*G06F 13/38* (2006.01)
*G06F 1/3234* (2019.01)
*G06F 1/3296* (2019.01)

(52) U.S. Cl.
CPC ........ *G06F 13/4081* (2013.01); *G06F 1/3206* (2013.01); *G06F 1/3253* (2013.01); *G06F 1/3296* (2013.01); *G06F 13/382* (2013.01); *G06F 2213/0042* (2013.01)

(58) Field of Classification Search
None
See application file for complete search history.

(56) References Cited

U.S. PATENT DOCUMENTS

| 9,887,571 | B1* | 2/2018 | Sultenfuss | ............ H02J 7/0068 |
| 9,952,986 | B2* | 4/2018 | Pethe | .................. G06F 13/4221 |
| 10,181,739 | B1* | 1/2019 | Sultenfuss | .............. H02J 7/342 |
| 2016/0370835 | A1* | 12/2016 | Erickson | ............... G06F 13/385 |
| 2017/0163074 | A1* | 6/2017 | Kimura | .................... H02J 7/025 |
| 2018/0239410 | A1* | 8/2018 | Paparrizos | .............. H02J 7/342 |
| 2018/0278082 | A1* | 9/2018 | Wu | ........................ H02J 7/085 |
| 2018/0323626 | A1* | 11/2018 | Suen | ..................... H02J 7/0044 |
| 2018/0341315 | A1* | 11/2018 | Suganuma | ............ G06F 1/3253 |
| 2018/0356873 | A1* | 12/2018 | Regupathy | ............ G06F 1/3287 |
| 2019/0196565 | A1* | 6/2019 | Shimamura | ............. G06F 1/266 |
| 2019/0324509 | A1* | 10/2019 | Thompson | ............ G06F 1/3231 |
| 2020/0287403 | A1* | 9/2020 | Liu | ........................... H02J 7/04 |

FOREIGN PATENT DOCUMENTS

JP 2018011442 A 1/2018

\* cited by examiner

*Primary Examiner* — Michael Sun
(74) *Attorney, Agent, or Firm* — Shimokaji IP (57) ABSTRACT

An information processing apparatus includes: a connection detection unit configured to detect connection of a device to USB connector; a device information acquisition unit configured to acquire first information indicating whether the device detected by the connection detection unit as being connected supports USB-PD standard, second information indicating whether the device supports one or both of power supply and power reception in the case where the device supports the USB-PD standard, and third information indicating whether the device supports data communication by USB; and a device determination unit configured to determine a type of the device based on the first information, the second information, and the third information.

7 Claims, 8 Drawing Sheets

FIG. 1

| Item | AC Adapter | Display/Dock | Laptop | | Type-A External Battery | Type-C External Battery |
|---|---|---|---|---|---|---|
| How to connect | Type-C to Type-C | Type-C to Type-C | Type-C to Type-C | Type-A to Type-C | Type-A to Type-C | Type-C to Type-C |
| USB Power Delivery (USB-PD) | Supported | Supported | Supported | Not supported | Not supported | Supported |
| USB-PD Power Role Capability | Source | Source | Source Sink | N/A | N/A | Source Sink |
| Data Communication | NO | YES | YES | YES | NO | NO |
| USB BC1.2 | NO | NO | NO | NO | YES | N/A |

FIG. 2

| Item | | AC Adapter<br>Type-C to Type-C | Display/Dock<br>Type-C to Type-C | Laptop<br>Type-C to Type-C | Laptop<br>Type-A to Type-C | Type-A External Battery<br>Type-A to Type-C | Type-C External Battery<br>Type-C to Type-C |
|---|---|---|---|---|---|---|---|
| How to connect | | Type-C to Type-C | Type-C to Type-C | Type-C to Type-C | Type-A to Type-C | Type-A to Type-C | Type-C to Type-C |
| USB Power Delivery (USB-PD) | | Supported | Supported | Supported | Not supported | Not supported | Supported |
| USB-PD Power Role Capability | | Source | Source | Source Sink | N/A | N/A | Source Sink |
| Data Communication | | NO | YES | YES | YES | NO | NO |
| USB BC1.2 | | NO | NO | NO | NO | YES | N/A |

| Item | AC Adapter | Display/Dock | Laptop | | Type-A External Battery | Type-C External Battery |
|---|---|---|---|---|---|---|
| How to connect | Type-C to Type-C | Type-C to Type-C | Type-C to Type-C | Type-A to Type-C | Type-A to Type-C | Type-C to Type-C |
| USB Power Delivery (USB-PD) | Supported | Supported | Supported | Not supported | Not supported | Supported |
| USB-PD Power Role Capability | Source | Source | Source Sink | N/A | N/A | Source Sink |
| Data Communication | NO | YES | YES | YES | NO | NO |
| USB BC1.2 | NO | NO | NO | NO | YES | N/A |

D12 (highlighted cells: "Not supported" and "YES" in Type-A External Battery column)

INFORMATION PROCESSING APPARATUS AND CONTROL METHOD

FIELD OF THE INVENTION

The present invention relates to an information processing apparatus and a control method.

BACKGROUND OF THE INVENTION

Portable apparatuses such as laptop personal computers (PCs) include Universal Serial Bus (USB) connectors. With connectors in compliance with the USB Type-C standard which has been increasingly used in recent years, power of 100 W at the maximum can be supplied if they support the USB Power Delivery (USB-PD) standard (for example, see Japanese Unexamined Patent Application Publication No. 2018-11442). They are also used as connectors for power supply from AC adapters and the like. While not at home or office, external batteries are used in order to extend the usable times of the portable apparatuses. The external batteries are also connected to USB Type-C connectors.

SUMMARY OF THE INVENTION

In the foregoing portable apparatus, the following control is typically performed: In the case where power is supplied from an AC adapter, the processing capability is optimized because power can be supplied sufficiently. In the case where power is supplied from a battery included in the portable apparatus, the battery life is optimized by reducing power consumption because suppliable power is limited. However, for example, both in the case where an AC adapter is connected to USB connector and in the case where an external battery is connected to USB connector, the portable apparatus performs control on the assumption that an AC adapter is connected, without determining the device connected to USB connector. Therefore, in the case where an external battery is connected to USB connector, despite power being supplied from the battery, it may be impossible to detect that power is supplied from the battery and perform appropriate control.

Moreover, while identifiers relating to device internal information such as battery information are prepared in the USB standard, there is hardly any device that actually uses such identifiers. Accordingly, it is difficult to detect the type of the device connected to USB connector by the method of identifier determination.

In view of the above, the present invention has an object of providing an information processing apparatus and a control method that easily detect the type of a device connected to USB connector.

The present invention has been made to solve the problem stated above. An information processing apparatus according to a first aspect of the present invention includes: a connection detection unit configured to detect connection of a device to Universal Serial Bus (USB); a device information acquisition unit configured to acquire first information indicating whether the device detected by the connection detection unit as being connected supports USB Power Delivery (USB-PD) standard, second information indicating whether the device supports one or both of power supply and power reception in the case where the device supports the USB-PD standard, and third information indicating whether the device supports data communication by USB; and a device determination unit configured to determine a type of the device based on the first information, the second information, and the third information.

In the information processing apparatus, the device determination unit may be configured to, in the case where the device detected by the connection detection unit as being connected supports both of the power supply and the power reception of the USB-PD standard and does not support the data communication by USB based on the first information, the second information, and the third information, determine that the device is a battery that supports USB Type-C standard.

In the information processing apparatus, the device information acquisition unit may be configured to acquire fourth information indicating whether the device detected by the connection detection unit as being connected supports USB Battery Charge Rev1.2 (BC1.2) standard, and the device determination unit may be configured to, in the case where the device detected by the connection detection unit as being connected does not support the USB-PD standard and supports the USB BC1.2 standard based on the first information and the fourth information, determine that the device is a battery that supports USB Type-A standard.

The information processing apparatus may include: a system processing unit configured to execute system processing; and an operation mode control unit configured to, in the case where the connection detection unit detects the connection of the device to the USB connector, control an operation mode of the system processing by the system processing unit to any of a first operation mode and a second operation mode in which power consumption is reduced as compared with the first operation mode, based on a determination result by the device determination unit.

In the information processing apparatus, the operation mode control unit may be configured to, based on the determination result by the device determination unit, control the operation mode to the first operation mode in the case where the device detected by the connection detection unit as being connected supports the USB-PD standard and is not a battery, and control the operation mode to the second operation mode in the case where the device is a battery.

In the information processing apparatus, the device information acquisition unit may be configured to acquire information about power supply capability of the device detected by the connection detection unit as being connected, and the operation mode control unit may be configured to control the operation mode to the second operation mode, in the case where the device detected by the connection detection unit as being connected supports the USB-PD standard and is not a battery and the power supply capability is less than a predetermined threshold.

A control method in an information processing apparatus according to a second aspect of the present invention includes: a step in which a connection detection unit detects connection of a device to USB connector; a step in which a device information acquisition unit acquires first information indicating whether the device detected by the connection detection unit as being connected supports USB-PD standard, second information indicating whether the device supports one or both of power supply and power reception in the case where the device supports the USB-PD standard, and third information indicating whether the device is capable of data communication by USB; and a step in which a device determination unit determines a type of the device based on the first information, the second information, and the third information.

The above-described aspects of the present invention can easily detect the type of a device connected to USB connector.

DETAILED DESCRIPTION OF THE INVENTION

Embodiments of the present invention will be described in detail below, with reference to the drawings.

First Embodiment

A first embodiment of the present invention will be described below.

Figure 1:
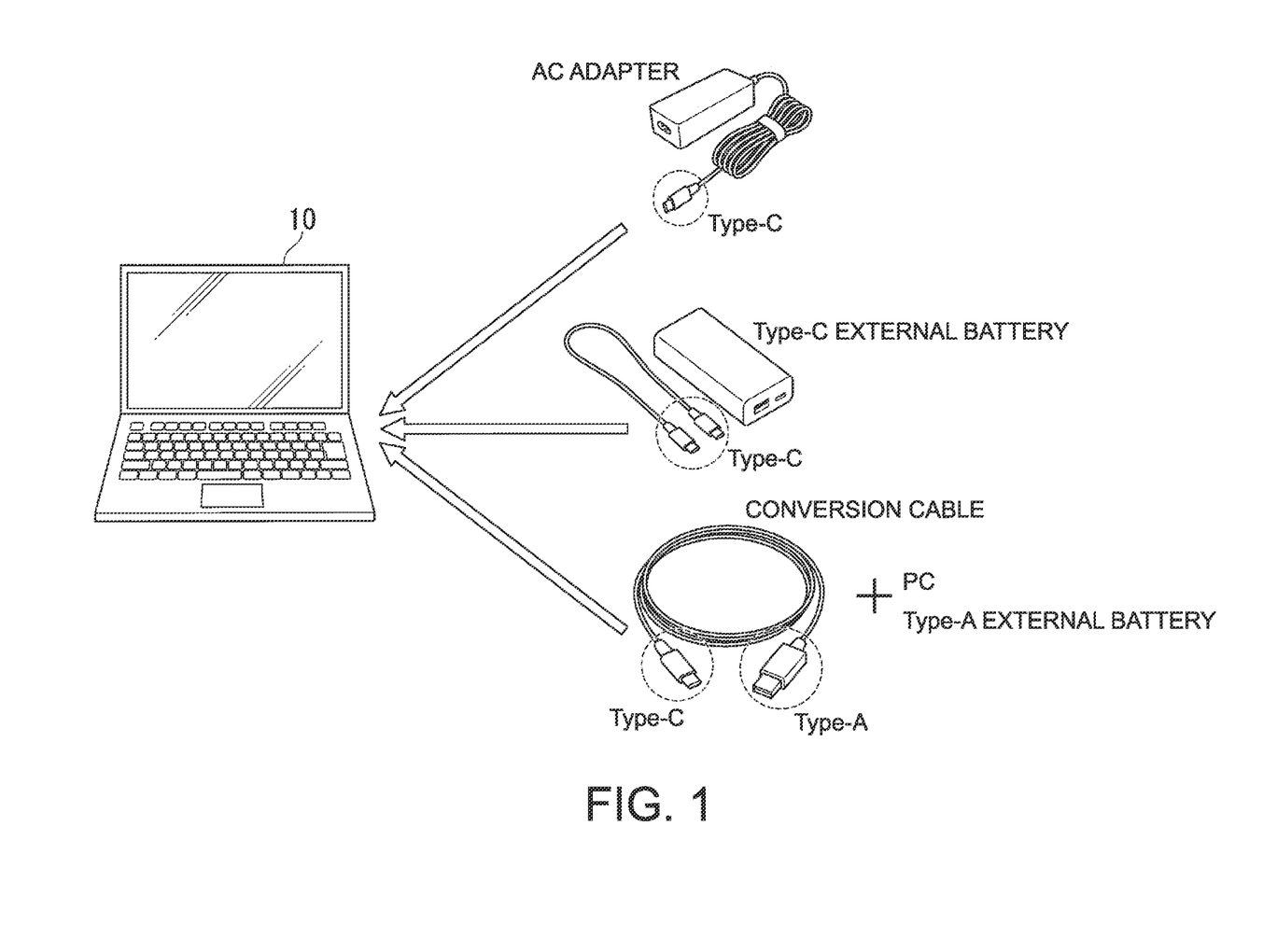
FIG. 1 is a diagram schematically illustrating USB connection to an information processing apparatus according to a first embodiment.

FIG. 1 is a diagram schematically illustrating USB connection to an information processing apparatus according to this embodiment. An information processing apparatus 10 illustrated in the drawing is, for example, a laptop personal computer (PC), and includes a connector (receptacle) compliant with the Universal Serial Bus (USB) Type-C standard (hereafter referred to as "Type-C connector"). Power supply, data communication, and the like are enabled via this Type-C connector. USB Type-C stipulates power requirements in two stages, namely, power requirements based on the USB Type-C standard and requirements based on the USB Power Delivery (USB-PD) standard. All USB Type-C connected apparatuses first start operation with power based on the USB Type-C standard, and, in the case where it supports USB-PD, switches to operation with power based on the USB-PD standard. In the USB Type-C standard, operation is performed at 5 V, and which current value from among 0.9 A, 1.5 A, and 3 A is allowed can be determined by the power reception side checking the setting of a pull-up resistor (Rp) of a power supply side CC (Configuration Channel) signal. In the USB-PD standard, operation at 5 V to 20 V and a maximum of 5 A (a maximum of 100 W) is possible. The voltage and current are determined by a negotiation between the power supply side and the power reception side.

Examples of devices connectable to the Type-C connector include an alternate current (AC) adapter, an external battery, a PC (e.g. laptop PC), and a display (display device). These devices may each be connected via a cable both ends of which have plugs supporting Type-C connector (hereafter referred to as "Type-C cable"), or via a cable one end of which supports Type-C connector and the other end of which is directly connected to the device. Connectable devices also include devices that support connectors (hereafter referred to as "Type-A connectors") compliant with the USB Type-A standard before USB Type-C. For example, a device such as an AC adapter, an external battery, or a PC (e.g. a laptop PC) supporting USB Type-A can be connected via a conversion cable one end of which has a plug supporting Type-C connector and the other end of which has a plug supporting Type-A connector.

Figure 2:
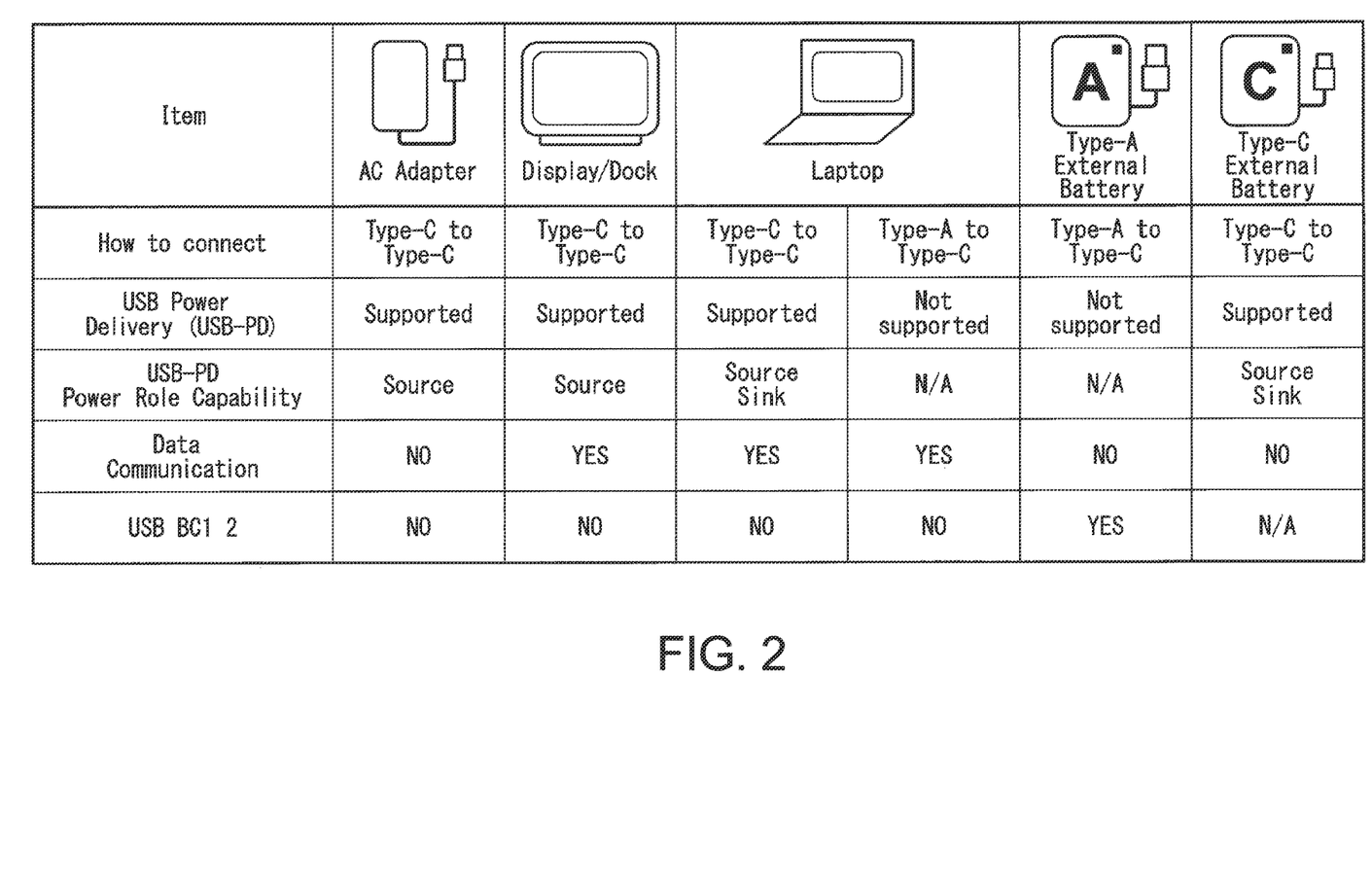
FIG. 2 is a diagram illustrating an example of devices connectable to the information processing apparatus according to the first embodiment.

FIG. 2 is a diagram illustrating an example of devices connectable to the information processing apparatus according to this embodiment. In the drawing, an AC adapter, a display, a laptop PC, an external battery supporting Type-A connector (hereafter referred to as "Type-A external battery"), and an external battery supporting Type-C connector (hereafter referred to as "Type-C external battery") are illustrated as an example of devices connectable to the information processing apparatus 10 including a Type-C connector. The drawing illustrates, for each device, connection method (How to connect), support for the USB-PD standard, type of USB-PD role (Power Role Capability), support for data communication, and support for the USB Battery Charge Rev1.2 (BC1.2) standard. USB-PD roles include power supply (Source) and power reception (Sink), and some devices are capable of switching between power supply (Source) and power reception (Sink) (role swap). In the drawing, for each device supporting role swap, both power supply side (Source) and power reception side (Sink) are indicated. For each device not supporting role swap, whether the device is power supply side (Source) or power reception side (Sink) is indicated. The USB BC1.2 standard is a charging-related standard formulated before the USB-PD standard. While suppliable power is up to 7.5 W in the USB BC1.2 standard, suppliable power is up to 100 W in the USB-PD standard.

An AC adapter is connected to the information processing apparatus 10 by a Type-C cable (Type-C to Type-C). The AC adapter supports the USB-PD standard (Supported), but does not support role swap and is limited to only power supply side (Source). The AC adapter does not support data communication (NO), and does not support the USB BC1.2 standard (NO).

A display is connected to the information processing apparatus 10 by a Type-C cable (Type-C to Type-C). The display supports the USB-PD standard (Supported), but does not support role swap and is limited to only power supply side (Source). The display supports data communication (YES), and does not support the USB BC1.2 standard (NO).

A laptop PC includes a laptop PC including a Type-C connector and a laptop PC including a Type-A connector. The laptop PC including a Type-C connector is connected to the information processing apparatus 10 by a Type-C cable (Type-C to Type-C). The laptop PC including a Type-C connector supports the USB-PD standard (Supported), and also supports role swap and can be both power supply side (Source) and power reception side (Sink). The laptop PC including a Type-A connector is connected to the information processing apparatus 10 by a conversion cable (Type-A to Type-C). The laptop PC including a Type-A connector does not support the USB-PD standard (Not supported). Both laptop PCs support data communication (YES), and do not support the USB BC1.2 standard (NO).

A Type-A external battery is connected to the information processing apparatus 10 by a conversion cable (Type-A to Type-C). The Type-A external battery does not support the USB-PD standard (Not supported), and supports the USB BC1.2 standard (YES). The Type-A external battery does not support data communication (NO).

A Type-C external battery is connected to the information processing apparatus 10 by a Type-C cable (Type-C to Type-C). The Type-C external battery supports the USB-PD standard (Supported), and also supports role swap and can be both power supply side (Source) and power reception side (Sink) (except for the USB BC1.2 standard). The Type-C external battery does not support data communication (NO).

Thus, each device connectable to the information processing apparatus 10 differs in whether standards relating to power supply and charging are supported and whether data communication is supported, depending on the type of the device. Accordingly, the information processing apparatus 10 acquires information about the standards and data communication for the device connected to the Type-C connector (attribute information of the device), and detects the type of the device based on the acquired information.

Figure 3:
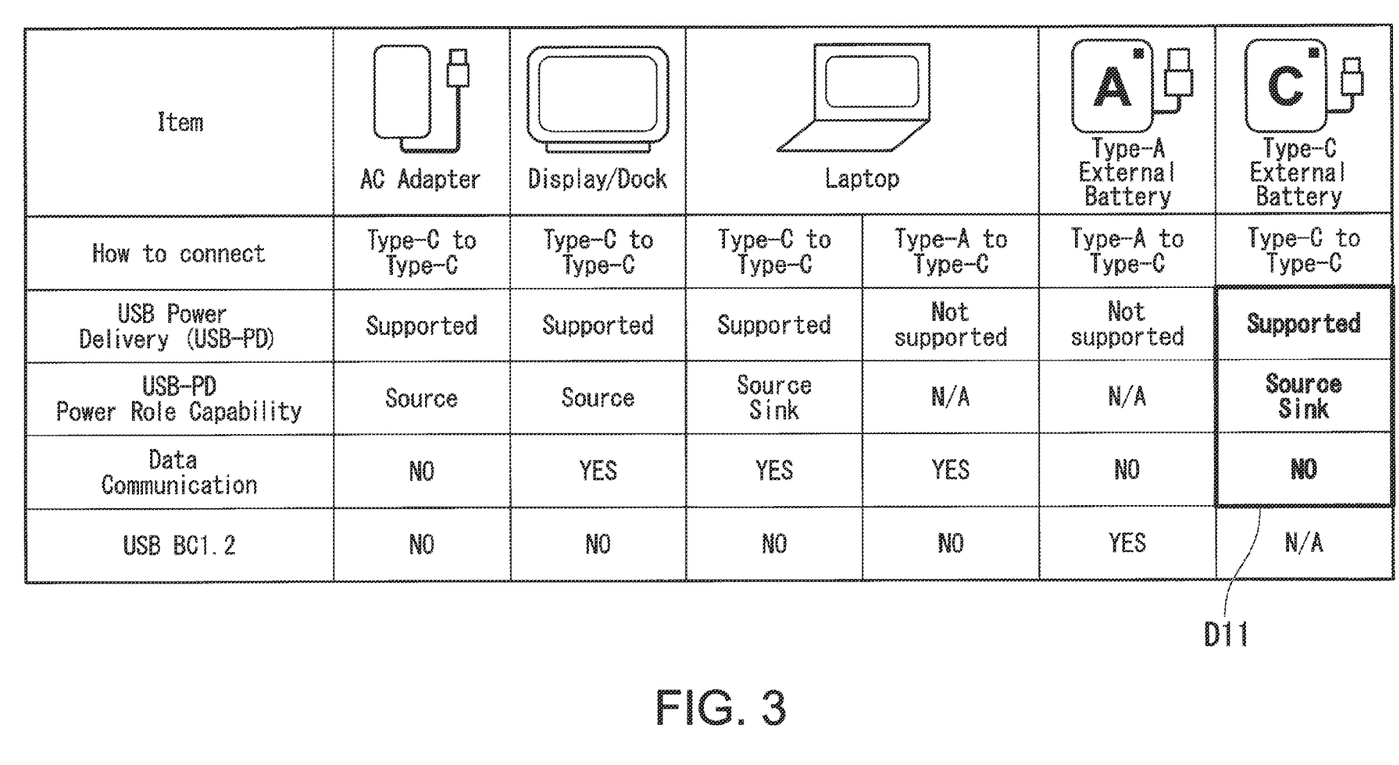
FIG. 3 is a diagram illustrating an example of information used in detection of a Type-C external battery.

FIG. 3 is a diagram illustrating an example of information used in detection of a Type-C external battery. The Type-C external battery can be detected using information about support for the USB-PD standard and information about support for data communication designated by symbol D11. For example, in the case where the connected device supports the USB-PD standard, supports the role function (can be both power supply side (Source) and power reception side (Sink)), and does not support data communication, the device can be determined as the Type-C external battery.

Figure 4:
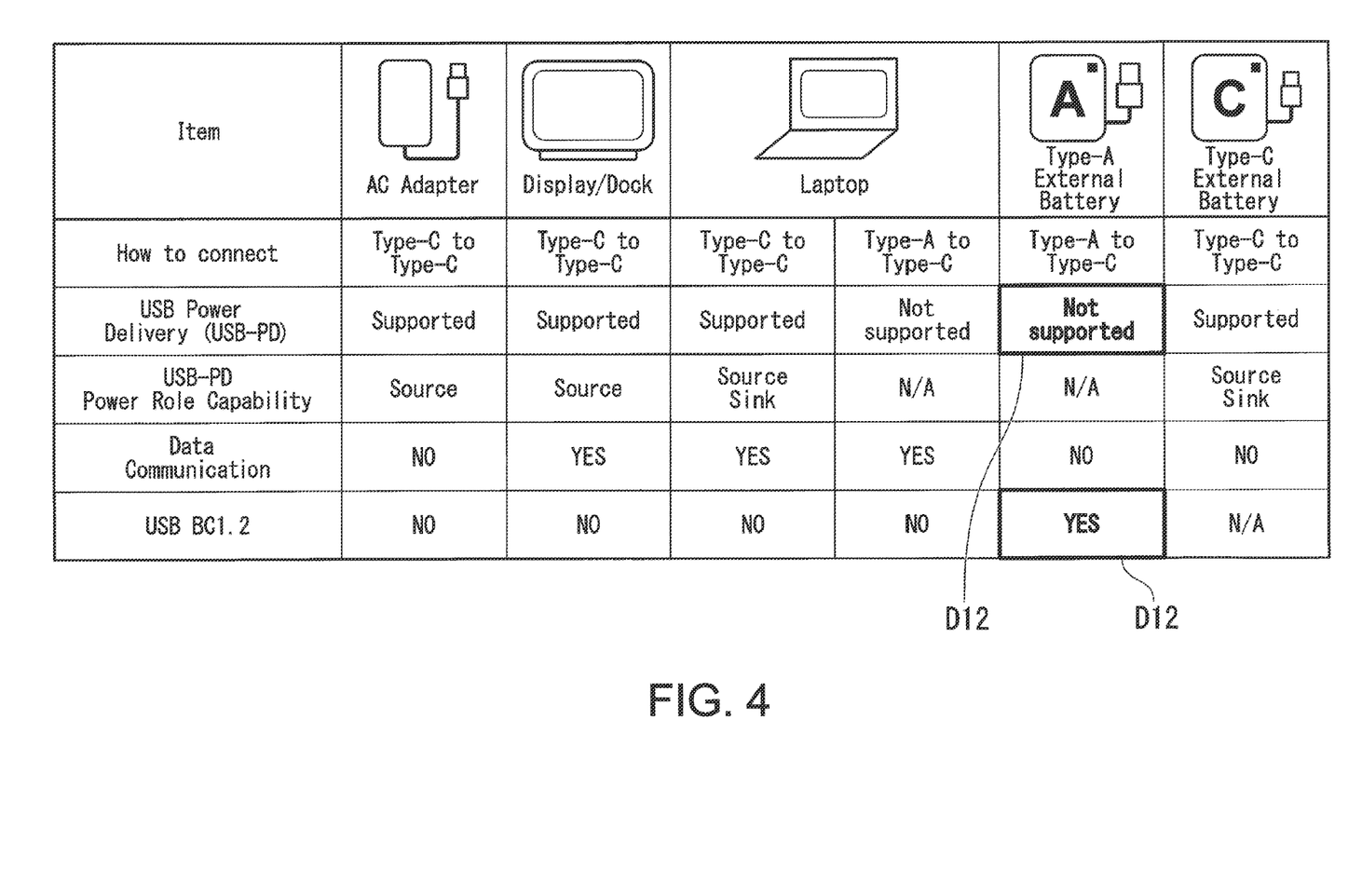
FIG. 4 is a diagram illustrating an example of information used in detection of a Type-A external battery.

FIG. 4 is a diagram illustrating an example of information used in detection of a Type-A external battery. The Type-A external battery can be detected using information about support for the USB-PD standard and information about support for the USB BC1.2 standard designated by symbol D12. For example, in the case where the connected device does not support the USB-PD standard and supports (complies with) the USB BC1.2 standard, the device can be determined as the Type-A external battery.

(Structure of Information Processing Apparatus 10)

The structure of the information processing apparatus 10 will be described below.

Figure 5:
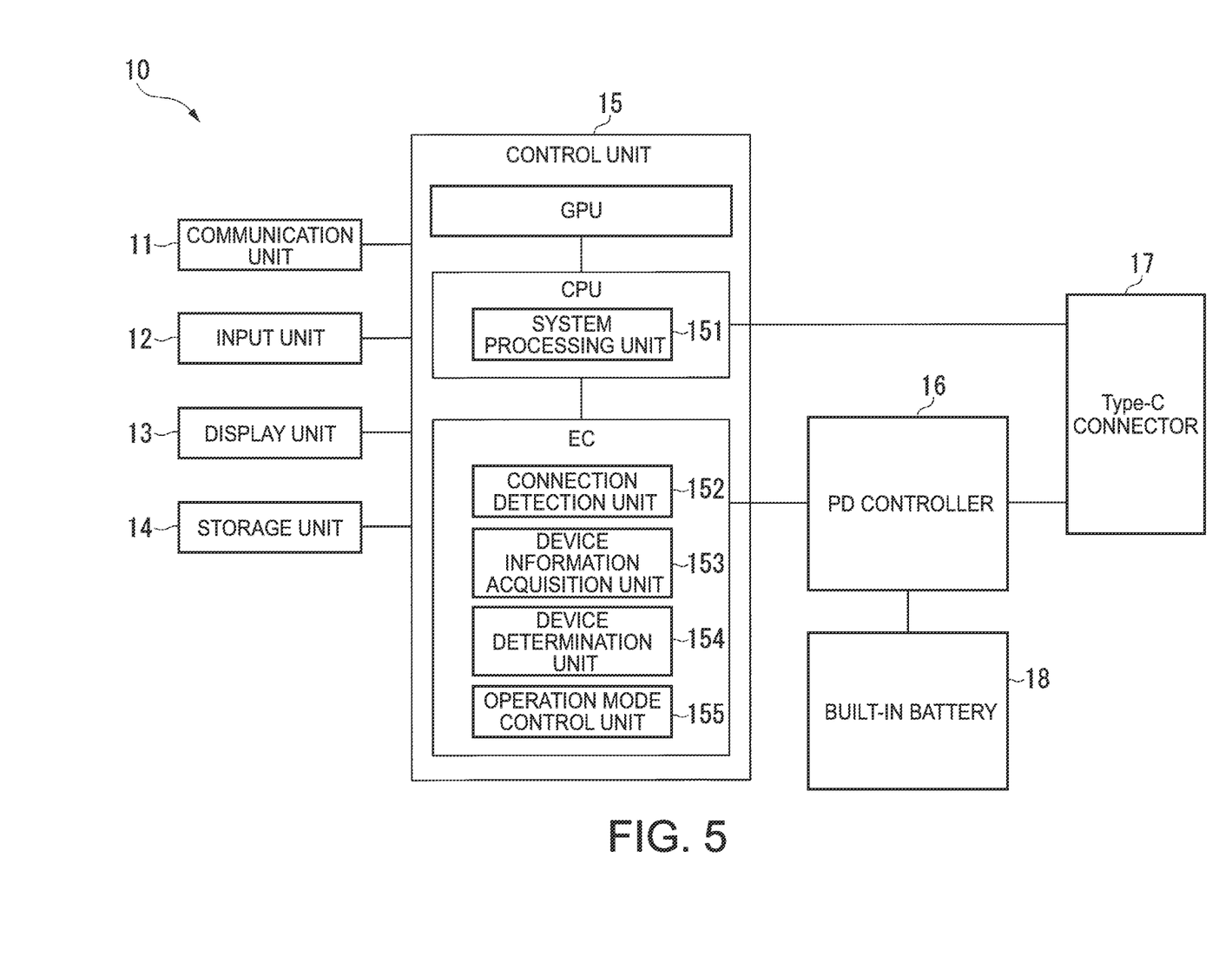
FIG. 5 is a block diagram illustrating an example of the structure of an information processing apparatus 10 according to the first embodiment.

FIG. 5 is a block diagram illustrating an example of the structure of the information processing apparatus 10 according to this embodiment. The information processing apparatus 10 includes a communication unit 11, an input unit 12, a display unit 13, a storage unit 14, a control unit 15, a PD controller 16, a Type-C connector 17, and a built-in battery 18.

The communication unit 11 includes, for example, a plurality of Ethernet® ports, a communication device for performing wireless communication such as Bluetooth® or Wi-Fi®, and the like. The input unit 12 includes a touch panel for detecting touch operation on a screen of the display unit 13, and operation buttons such as a power button for powering on/off the information processing apparatus 10. The input unit 12 outputs input information based on the received operation input. The display unit 13 includes a liquid crystal display, an organic EL display panel, or the like.

The storage unit 14 includes, for example, a hard disk drive (HDD), a solid state drive (SSD), electrically erasable programmable read-only memory (EEPROM), read-only memory (ROM), Flash-ROM, random access memory (RAM), etc., and stores programs, data, and the like.

The control unit 15 includes a central processing unit (CPU), a graphic processing unit (GPU), an embedded controller (EC), and the like. The control unit 15 executes a program such as BIOS, an OS, or each type of application, to boot (start) a system such as BIOS or the OS or perform each type of operation, processing, etc. The control unit 15 also performs memory control, such as data read, write, and deletion, on the storage unit 14, etc.

The control unit 15 controls a power circuit such as a DC (direct current)/DC converter (not illustrated), to control power supply to each unit in the information processing apparatus 10. The DC/DC converter, for example, converts voltage of DC power supplied from a device such as an AC adapter or an external battery connected to the Type-C connector 17 or voltage of DC power supplied from the built-in battery 18 into voltage required in each unit, and supplies the voltage to the unit via a power system. For example, in the case where an external power source such as an AC adapter or an external battery is connected to the Type-C connector 17, the control unit 15 performs control so that power supplied from the external power source is supplied to each unit with priority over power supplied from the built-in battery 18, and controls charging the built-in battery 18.

The Type-C connector 17 is a receptacle compliant with the USB Type-C standard. The Type-C connector 17 is provided with a VBUS terminal and a GND terminal for power, a configuration channel (CC) terminal, D+/D− terminals, and the like. The CC terminal is used, for example, for detection of connection of a device to the Type-C connector 17, acquisition of various information (support for the USB-PD standard, support for power supply side and power reception side, support for USB BC1.2, support for data communication, etc.) from the device, and negotiation of communication with the device.

The PD controller 16 communicates with the device connected to the Type-C connector 17, and controls, for example, power supply to or power reception from the device. In the case where the device is connected to the Type-C connector 17, the PD controller 16 detects the connection of the device and acquires or determines information of the connected device (attribute information of the device) via the CC terminal or the like. For example, based on communication with the device connected to the Type-C connector 17 via the CC terminal, the PD controller 16 acquires or determines information about support for the USB-PD standard, information about whether one or both of power supply and power reception are supported in the case where the USB-PD standard is supported, information about support for data communication, and information about support for the USB BC1.2 standard.

A function of determining the type of the device connected to the Type-C connector 17 and a function of controlling the operation mode of the system based on the detection result will be described below. The control unit includes a system processing unit 151, a connection detection unit 152, a device information acquisition unit 153, a device determination unit 154, and an operation mode control unit 155.

The system processing unit 151 executes system processing by the OS (operating system) or processing by an application that operates on the OS.

The connection detection unit 152 detects connection of a device to USB connector. For example, in the case where the PD controller 16 detects that the device is connected to the Type-C connector 17, the connection detection unit 152 acquires the detection result from the PD controller 16, and detects that the device is connected to USB connector.

The device information acquisition unit 153 acquires, in the case where the connection detection unit 152 detects the connection, information about the connected device from the PD controller 16. For example, the device information acquisition unit 153 acquires first information indicating whether the device detected as being connected supports the USB-PD standard, second information indicating whether the device supports one or both of power supply and power reception in the case where the device supports the USB-PD standard, and third information indicating whether the device supports data communication by USB. The device information acquisition unit 153 may further acquire fourth information indicating whether the device detected as being connected supports the USB BC1.2 standard.

The device determination unit 154 determines the type of the device connected to USB connector. For example, the device determination unit 154 determines whether the device detected by the connection detection unit 152 as being connected is a battery, based on the first information, the second information, and the third information. For example, in the case where the device detected as being connected supports both of power supply and power reception of the USB-PD standard and does not support data communication by USB based on the first information, the second information, and the third information, the device determination unit 154 determines that the device is a Type-C external battery.

In the case where the device detected by the connection detection unit 152 as being connected does not support the USB-PD standard and supports the USB BC1.2 standard based on the first information and the fourth information, the device determination unit 154 determines that the device is a Type-A external battery. In the case where the connected device does not support the USB-PD standard, the device determination unit 154 may determine that the connected device is a Type-C external battery, based on an operation condition of power defined in the USB Type-C standard. For example, in the case where the connected device has setting of 1.5 A/3 A among current value settings (0.9 A/1.5 A/3 A) allowed in the USB Type-C standard, the device determination unit 154 may determine that the connected device is a Type-C external battery, without determining whether the device supports the USB BC1.2 standard.

The operation mode control unit 155 controls the operation mode of system processing executed by the system processing unit 151 to any of an adapter operation mode (first operation mode) and a battery operation mode (second operation mode).

The adapter operation mode is an operation mode that is suitable when sufficient power is supplied from an AC adapter, etc., and prioritizes enhancement of processing capability (performance) over reduction of power consumption. The battery operation mode is an operation mode that is suitable when suppliable power is limited, such as when power is supplied from the built-in battery 18 or the like, and reduces power consumption as compared with the adapter operation mode. In the case where no device is connected to the Type-C connector 17, the information processing apparatus 10 operates with power supplied from the built-in battery 18, so that the information processing apparatus 10 is preferably controlled to the battery operation mode. In the case where a device is connected to the Type-C connector 17, if the connected device is an AC adapter, the information processing apparatus 10 is preferably controlled to the adapter operation mode. If the connected device is a battery, on the other hand, the information processing apparatus 10 is preferably controlled to the battery operation mode because controlling the information processing apparatus 10 to the adapter operation mode despite the connected device being a battery reduces the time during which the information processing apparatus 10 is operable by the battery.

In the case where connection of a device to USB connector is not detected by the connection detection unit 152, the operation mode control unit 155 controls the operation mode to the battery operation mode. In the case where connection of a device to USB connector is detected by the connection detection unit 152, the operation mode control unit 155 controls the operation mode to any of the adapter operation mode and the battery operation mode, based on the determination result by the device determination unit 154. For example, in the case where the device detected by the connection detection unit 152 as being connected is a battery (Type-C external battery or Type-A external battery) based on the determination result by the device determination unit 154, the operation mode control unit 155 controls the operation mode to the battery operation mode. In the case where the device detected by the connection detection unit 152 as being connected is not a battery based on the determination result by the device determination unit 154, the operation mode control unit 155 controls the operation mode to the adapter operation mode.

(Operation of Device Determination Process)

Operation of a device determination process by which the control unit 15 in the information processing apparatus 10 determines the type of a device connected to the Type-C connector 17 will be described below.

Figure 6:
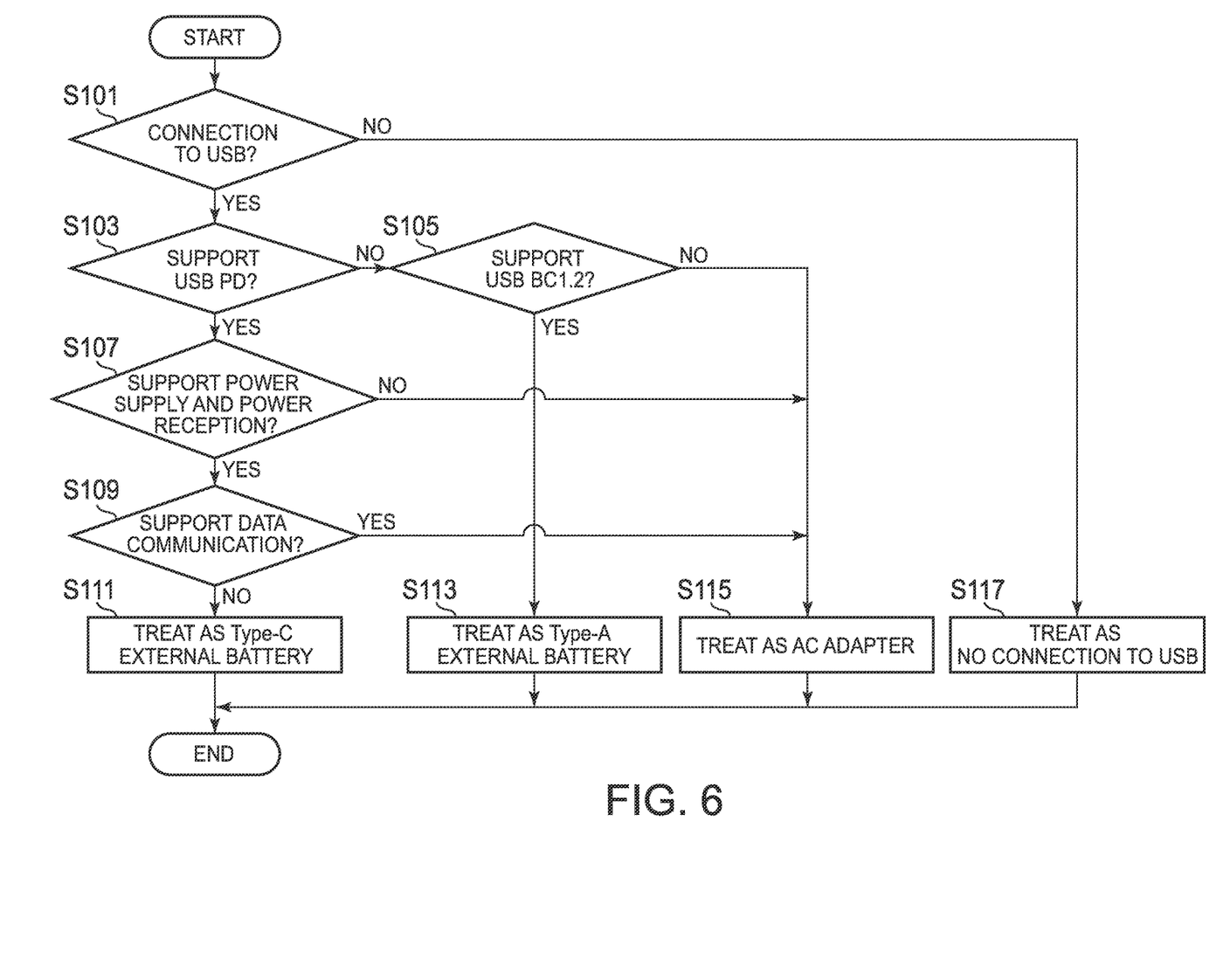
FIG. 6 is a flowchart illustrating an example of a device determination process according to the first embodiment.

FIG. 6 is a flowchart illustrating an example of the device determination process according to this embodiment.

(Step S101) The control unit 15 determines, via the PD controller 16, whether a device is connected to the Type-C connector 17, to detect connection of a device to USB connector. In the case where the control unit 15 determines that a device is connected to the Type-C connector 17 (YES), the control unit 15 advances to a process in step S103. In the case where the control unit 15 determines that a device is not connected to the Type-C connector 17 (NO), the control unit 15 advances to a process in step S117.

(Step S103) The control unit 15 acquires information about the device connected to the Type-C connector 17 (attribute information of the device), from the PD controller 16. The control unit 15 then determines whether the device connected to the Type-C connector 17 supports the USB-PD standard. In the case where the control unit 15 determines that the device supports the USB-PD standard (YES), the control unit 15 advances to a process in step S107. In the case where the control unit 15 determines that the device does not support the USB-PD standard (NO), the control unit 15 advances to a process in step S105.

(Step S105) The control unit 15 determines whether the device connected to the Type-C connector 17 supports the USB BC1.2 standard. In the case where the control unit 15 determines that the device supports the USB BC1.2 standard (YES), the control unit 15 advances to a process in step S113. In the case where the control unit 15 determines that the device does not support the USB BC1.2 standard (NO), the control unit 15 advances to a process in step S115.

(Step S107) The control unit 15 determines whether the device connected to the Type-C connector 17 supports both of power supply and power reception of the USB-PD standard. In the case where the control unit 15 determines that the device supports both of power supply and power reception (YES), the control unit 15 advances to a process in step S109. In the case where the control unit 15 determines that the device supports only one of power supply and power reception (NO), the control unit 15 advances to a process in step S115.

(Step S109) The control unit 15 determines whether the device connected to the Type-C connector 17 supports data communication. In the case where the control unit 15 determines that the device supports data communication (YES), the control unit 15 advances to a process in step S115. In the case where the control unit 15 determines that the device does not support data communication (NO), the control unit 15 advances to a process in step S111.

(Step S111) The control unit 15 determines that the device connected to the Type-C connector 17 is a Type-C external battery. That is, in the case where the device connected to the Type-C connector 17 supports both of power supply and power reception of the USB-PD standard and does not support data communication by USB, the control unit 15 determines that the device is a Type-C external battery. In this case, the control unit 15 treats the USB connected device as a Type-C external battery.

(Step S113) The control unit 15 determines that the device connected to the Type-C connector 17 is a Type-A external battery. That is, in the case where the device connected to the Type-C connector 17 does not support the USB-PD standard and supports the USB BC1.2 standard, the control unit 15 determines that the device is a Type-A external battery. In this case, the control unit 15 treats the USB connected device as a Type-A external battery.

(Step S115) The control unit 15 determines that the device connected to the Type-C connector 17 is not an external battery. That is, in the case where the device connected to the Type-C connector 17 does not support any of the USB-PD standard and the USB BC1.2 standard, in the case where the device connected to the Type-C connector 17 supports the USB-PD standard and supports only one of power supply and power reception, or in the case where the device connected to the Type-C connector 17 supports both of power supply and power reception of the USB-PD standard and supports data communication, the control unit 15 determines that the device is not an external battery. In this case, the control unit 15 treats the USB connected device as, for example, an AC adapter.

(Step S117) The control unit 15 determines that no device is connected to the Type-C connector 17. That is, the control unit 15 treats no device as being connected to USB connector.

Operation of an operation mode control process by which the control unit 15 controls the operation mode of system processing when a device is connected to USB connector will be described below.

Figure 7:
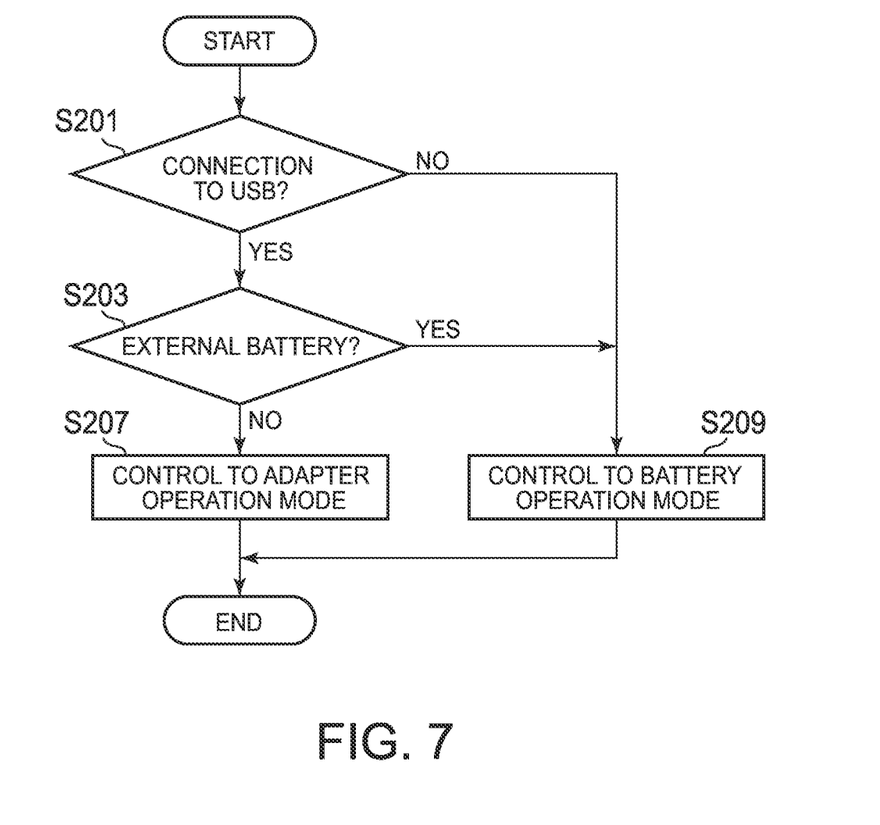
FIG. 7 is a flowchart illustrating an example of an operation mode control process according to the first embodiment.

FIG. 7 is a flowchart illustrating an example of the operation mode control process according to this embodiment.

(Step S201) The control unit 15 determines, via the PD controller 16, whether a device is connected to the Type-C connector 17, to detect connection of a device to USB connector. In the case where the control unit 15 determines that a device is connected to the Type-C connector 17 (YES), the control unit 15 advances to a process in step S203. In the case where the control unit 15 determines that a device is not connected to the Type-C connector 17 (NO), the control unit 15 advances to a process in step S209.

(Step S203) The control unit 15 determines whether the device connected to the Type-C connector 17 is an external battery, based on the determination result of the device determination process described with reference to FIG. 6.

More specifically, for example, the control unit 15 determines whether the device connected to the Type-C connector 17 is an external battery (Type-C external battery or Type-A external battery) or a device that supports the USB-PD standard and is not an external battery (i.e. a device capable of supplying power other than a battery). In the case where the control unit 15 determines that the device is an external battery (YES), the control unit 15 advances to a process in step S209. In the case where the control unit 15 determines that the device supports the USB-PD standard and is not an external battery (NO), the control unit 15 advances to a process in step S207.

(Step S207) The control unit 15 controls the operation mode of system processing to the adapter operation mode. That is, the control unit 15 controls system processing to the adapter operation mode, in the case where it is determined that a device other than an external battery is connected to USB connector.

(Step S209) The control unit 15 controls the operation mode of system processing to the battery operation mode. That is, the control unit 15 controls system processing to the battery operation mode, in the case where no device is connected to USB connector or in the case where it is determined that the device connected to USB connector is an external battery.

As described above, the information processing apparatus 10 according to this embodiment detects connection of a device to USB connector, acquires first information indicating whether the device detected as being connected supports the USB-PD standard, second information indicating whether the device supports one or both of power supply and power reception in the case where the device supports the USB-PD standard, and third information indicating whether the device supports data communication by USB, and determines the type of the device connected to USB based on the acquired information.

Thus, with use of versatile information acquirable from the device connected to USB connector, the information processing apparatus 10 can easily detect the type of the device. The use of the versatile information enables the information processing apparatus 10 to easily detect the types of many devices.

For example, in the case where the device detected as being connected to USB connector supports both of power supply and power reception of the USB-PD standard and does not support data communication by USB based on the first information, the second information, and the third information, the information processing apparatus 10 determines that the device is a Type-C external battery (an example of a battery).

Thus, with use of versatile information acquirable from the device connected to USB connector, the information processing apparatus 10 can easily detect whether the device is a Type-C external battery.

The information processing apparatus 10 may further acquire fourth information indicating whether the device detected as being connected to USB connector supports the USB BC1.2 standard. In the case where the device detected as being connected to USB connector does not support the USB-PD standard and supports the USB BC1.2 standard based on the first information and the fourth information, the information processing apparatus 10 may determine that the device is a Type-A external battery (an example of a battery).

Thus, with use of versatile information acquirable from the device connected to USB connector, the information processing apparatus 10 can easily detect whether the device is a Type-A external battery.

The information processing apparatus 10 executes system processing, and, in the case where the connection of the device to USB connector is detected, controls, based on the determination result of the type of the device, the operation mode of system processing to any of an adapter operation mode (an example of a first operation mode) and a battery operation mode (an example of a second operation mode) in which power consumption is reduced as compared with the adapter operation mode.

Thus, the information processing apparatus 10 can appropriately control whether to set the operation mode of system processing to the operation mode that prioritizes processing capability (performance) or the operation mode that prioritizes battery life by reducing power consumption, depending on the type of the device connected to USB connector.

For example, in the case where the device detected as being connected to USB connector supports the USB-PD standard and is not an external battery (an example of a battery) based on the determination result of the type of the device, the information processing apparatus 10 controls the operation mode to the adapter operation mode. In the case where the device is an external battery, the information processing apparatus 10 controls the operation mode to the battery operation mode.

Thus, the information processing apparatus 10 can set the operation mode that prioritizes battery life by reducing power consumption, in the case where an external battery is connected to USB connector.

Second Embodiment

A second embodiment of the present invention will be described below.

The first embodiment describes an example in which, in the case where the device connected to USB connector is not an external battery, the operation mode is controlled to the adapter operation mode on the assumption that the power supply capability is sufficient. However, there may be cases where the power supply capability is insufficient even when the device connected to USB connector is not an external battery. Examples of the cases where the power supply capability is insufficient include a laptop PC operating with a power source (e.g. AC adapter) capable of supplying current of less than a predetermined value or a built-in battery whose remaining battery level is less than a predetermined value.

Hence, in this embodiment, the device information acquisition unit 153 further acquires information about the power supply capability of the device connected to the Type-C connector 17, via the PD controller 16. Even in the case where the device connected to the Type-C connector 17 is not an external battery, if the power supply capability of the device is less than a predetermined threshold, the operation mode control unit 155 may control the operation mode to the battery operation mode.

Figure 8:
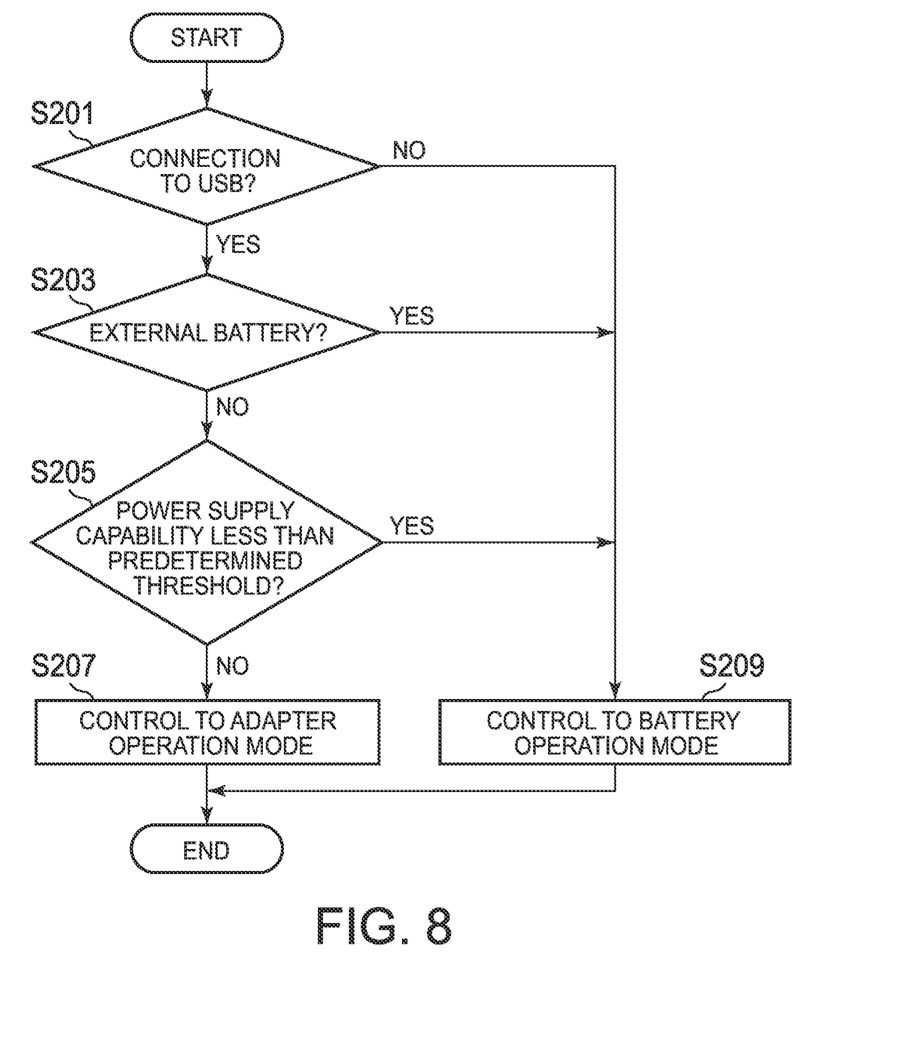
FIG. 8 is a flowchart illustrating an example of an operation mode control process according to a second embodiment.

FIG. 8 is a flowchart illustrating an example of an operation mode control process according to this embodiment. The operation mode control process illustrated in the drawing differs from the operation mode control process illustrated in FIG. 7 in that a process in step S205 is added. In the drawing, the same processes as those in FIG. 7 are given the same symbols, and their description is omitted.

In step S203, in the case where the control unit 15 determines that the device connected to the Type-C connector supports the USB-PD standard and is not an external battery (NO), the control unit 15 advances to a process in step S205.

(Step S205) The control unit 15 determines whether the power supply capability of the device connected to the Type-C connector 17 is less than a predetermined threshold. In the case where the control unit 15 determines that the power supply capability is less than the predetermined threshold (YES), the control unit 15 advances to a process in step S209, and controls system processing to the battery operation mode. In the case where the control unit 15 determines that the power supply capability is not less than the predetermined threshold (NO), the control unit 15 advances to a process in step S207.

As described above, the information processing apparatus 10 according to this embodiment acquires information about the power supply capability of the device detected as being connected to USB connector. Even in the case where the device detected as being connected supports the USB-PD standard and is not an external battery (an example of a battery), if the power supply capability is less than the predetermined threshold, the information processing apparatus 10 controls the operation mode to the battery operation mode.

Thus, for example, even in the case where an AC adapter is connected to USB connector, if the power supply capability of the AC adapter is low, the information processing apparatus 10 can set the operation mode that prioritizes battery life by reducing power consumption.

While the embodiments of the present invention have been described in detail above with reference to the drawings, the specific structures are not limited to such, and various design changes and the like can be made without departing from the scope of the present invention. For example, the structures described in the foregoing embodiments may be freely combined.

Although the above describes the process of controlling the operation mode of system processing to the adapter operation mode or the battery operation mode based on whether the device connected to USB connector is an external battery with reference to FIGS. 7 and 8, the information processing apparatus 10 may, in the case of switching from the adapter operation mode to the battery operation mode, notify the user of the switching. Alternatively, the information processing apparatus 10 may switch from the adapter operation mode to the battery operation mode after checking with the user regarding the switching. Likewise, the information processing apparatus 10 may, in the case of switching from the battery operation mode to the adapter operation mode, notify the user of the switching. Alternatively, the information processing apparatus 10 may switch from the battery operation mode to the adapter operation mode after checking with the user regarding the switching.

Although the foregoing embodiments describe the process by which the information processing apparatus 10 determines whether the device connected to USB connector is an external battery, the information processing apparatus 10 may determine the type of a device other than an external battery. For example, the information processing apparatus 10 may determine, based on information acquired from the device connected to USB connector, whether the device is an AC adapter, or whether the device is a device capable of data communication by USB (e.g. a display or a PC). As an example, in the case where the device connected to USB connector supports only power supply side (Source) of the USB-PD standard and does not support data communication, the information processing apparatus 10 may determine that the device is an AC adapter.

In the example of the structure of the information processing apparatus 10 illustrated in FIG. 5, the units in the control unit 15 are arranged so that the system processing unit 151 is included in a CPU and the connection detection unit 152, the device information acquisition unit 153, the device determination unit 154, and the operation mode control unit 155 are included in an EC. However, the present invention is not limited to such. For example, the control unit 15 may include processing units such as a sensor hub and a chipset, and a processing unit other than an EC may include all or part of the connection detection unit 152, the device information acquisition unit 153, the device determination unit 154, and the operation mode control unit 155.

The foregoing information processing apparatus 10 includes a computer system. Processes in the components in the foregoing information processing apparatus 10 may be performed by recoding a program for implementing the functions of the components in the foregoing information processing apparatus 10 on a computer-readable recording medium and causing a computer system to read and execute the program recorded on the recording medium. Herein, "causing the computer system to read and execute the program recorded on the recording medium" includes installing the program in the computer system. The "computer system" herein includes an OS and hardware such as peripheral devices. The "computer system" may include a plurality of computer apparatuses connected via the Internet, a WAN, a LAN, or a network including a communication line such as a dedicated line. The "computer-readable recording medium" refers to a portable medium such as a flexible disk, a magneto-optical disc, a ROM, or a CD-ROM, or a storage device such as a hard disk embedded in the computer system. Thus, the recording medium storing the program may be a non-transitory recording medium such as a CD-ROM.

The recording medium includes a recording medium internally or externally provided to be accessible from a distribution server for distributing the program. A configuration in which the program is divided into a plurality of parts and the components in the information processing apparatus 10 combine the parts after the parts are downloaded at different timings may be adopted, and distribution servers for distributing the parts into which the program is divided may be different. The "computer-readable recording medium" includes a medium that holds the program for a certain period of time, such as a volatile memory (RAM) inside a computer system serving as a server or a client when the program is transmitted via a network. The program may be a program for implementing some of the above-described functions. The program may be a differential file (differential program) that can implement the above-described functions in combination with a program already recorded in the computer system.

Some or all of the functions included in the information processing apparatus 10 according to each of the foregoing embodiments may be implemented as an integrated circuit such as large scale integration (LSI). The above-described functions may be individually formed as a processor, or some or all thereof may be integrated into a processor. A method of forming an integrated circuit is not limited to LSI, and may be implemented by a dedicated circuit or a general-purpose processor. In the case where integrated circuit technology that can replace LSI emerges as a result of the advancement of semiconductor technology, an integrated circuit based on such technology may be used.

Although the foregoing embodiments describe an example in which the information processing apparatus 10 is a laptop PC, the information processing apparatus 10 may be a tablet PC. The information processing apparatus 10 is not limited to a PC, and may be a smartphone, a game machine, or the like.

The invention claimed is:

1. An information processing apparatus comprising:
   a connection detection unit configured to detect connection of a device to a Universal Serial Bus (USB);
   a device information acquisition unit configured to acquire first information indicating whether the device detected by the connection detection unit, as being connected, supports USB Power Delivery (USB-PD) standard, second information indicating whether the device supports one or both of power supply and power reception in the case where the device supports the USB-PD standard, and third information indicating whether the device supports data communication by the USB; and
   a device determination unit configured to determine a type of the device based on the first information, the second information, and the third information;
   wherein the device determination unit is configured to, in the case where the device detected by the connection detection unit, as being connected, supports both the power supply and the power reception of the USB-PD standard and does not support the data communication by the USB based on the first information, the second information, and the third information, determine that the device is a battery that supports USB Type-C standard.

2. The information processing apparatus according to claim 1, wherein the device information acquisition unit is configured to acquire fourth information indicating whether the device detected by the connection detection unit, as being connected, supports a USB Battery Charge Rev1.2 (BC1.2) standard, and
   wherein the device determination unit is configured to, in the case where the device detected by the connection detection unit, as being connected, does not support the USB-PD standard and supports the USB BC1.2 standard based on the first information and the fourth information, determine that the device is a battery that supports a USB Type-A standard.

3. The information processing apparatus according to claim 1, further comprising:
   a system processing unit configured to execute system processing; and
   an operation mode control unit configured to, in the case where the connection detection unit detects the connection of the device to the USB connector, control an operation mode of the system processing by the system processing unit to any of a first operation mode and a second operation mode in which power consumption is reduced as compared with the first operation mode, based on a determination result by the device determination unit.

4. The information processing apparatus according to claim 3, wherein the operation mode control unit is configured to, based on the determination result by the device determination unit, control the operation mode to the first operation mode in the case where the device detected by the connection detection unit, as being connected, supports the USB-PD standard and is not a battery, and control the operation mode to the second operation mode in the case where the device is a battery.

5. The information processing apparatus according to claim 4, wherein the device information acquisition unit is configured to acquire information about power supply capability of the device detected by the connection detection unit, as being connected, and wherein the operation mode control unit is configured to control the operation mode to the second operation mode, in the case where the device detected by the connection detection unit, as being connected, supports the USB-PD standard and is not a battery and the power supply capability is less than a predetermined threshold.

6. A control method in an information processing apparatus, the control method comprising:

a step in which a connection detection unit detects connection of a device to a USB connector;

a step in which a device information acquisition unit acquires first information indicating whether the device detected by the connection detection unit, as being connected, supports a USB-PD standard, second information indicating whether the device supports one or both of power supply and power reception in the case where the device supports the USB-PD standard, and third information indicating whether the device is capable of data communication by a USB;

a step in which a device determination unit determines a type of the device based on the first information, the second information, and the third information; and a step in which the device determination unit, in the case where the device detected by the connection detection unit, as being connected, supports both the power supply and the power reception of the USB-PD standard and does not support the data communication by the USB based on the first information, the second information, and the third information, determines that the device is a battery that supports USB Type-C standard.

7. A computing device, comprising:

a processor;

a USB Type-C port configured to receive power; and a power controller configured to set a power profile of the processor to one of an adapter operation mode and a battery operation mode, the battery operation mode having reduced power consumption as compared to the adapter operation mode, wherein the power controller is configured to, upon an external power supply device being connected to the USB Type-C port:

determine whether the external power supply device is a battery based on attribute information acquired from the external power supply device, and upon determining that the external power supply device is a battery, set the power profile of the processor to the battery operation mode.

* * * * *